(12) United States Patent
Uzelac et al.

(10) Patent No.: US 9,515,876 B2
(45) Date of Patent: Dec. 6, 2016

(54) SYSTEM AND METHOD FOR NETWORK PROVISIONING

(71) Applicant: Level 3 Communications, LLC, Broomfield, CO (US)

(72) Inventors: Adam Charles Uzelac, Rochester, NY (US); Darren Behmlander, Whitelake, MI (US); Michael Dana Chan, Canton, MI (US); Thomas Doyle, South Lyon, MI (US); Gregory Pendergrast, Royal Oak, MI (US); Kenneth Zaleski, Westland, MI (US); Richard Dean Terpstra, Superior, CO (US); Richard D. Moore, Broomfield, CO (US); George McFalls, Broomfield, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 65 days.

(21) Appl. No.: 14/229,160

(22) Filed: Mar. 28, 2014

(65) Prior Publication Data

US 2014/0294013 A1    Oct. 2, 2014

Related U.S. Application Data

(60) Provisional application No. 61/806,298, filed on Mar. 28, 2013.

(51) Int. Cl.
*H04L 12/24* (2006.01)

(52) U.S. Cl.
CPC ....... *H04L 41/0806* (2013.01); *H04L 41/5054* (2013.01)

(58) Field of Classification Search
CPC . H04L 47/622; H04L 41/0806; H04L 41/5054
See application file for complete search history.

(56) References Cited

U.S. PATENT DOCUMENTS

| | | |
|---|---|---|
| 2005/0055466 A1 | 3/2005 | Matsuno et al. |
| 2006/0064697 A1 | 3/2006 | Kagi et al. |
| 2009/0070770 A1* | 3/2009 | Gasca, Jr. ............. G06F 9/5061 |
| | | 718/104 |
| 2011/0093367 A1* | 4/2011 | Stapleton ............... G06Q 40/12 |
| | | 705/30 |
| 2012/0147894 A1 | 6/2012 | Mulligan et al. |

(Continued)

OTHER PUBLICATIONS

International Search Report, dated Sep. 4, 2014, Int'l Appl. No. PCT/US14/032200, Int'l Filing Date Mar. 28, 2014; 3 pgs.

(Continued)

*Primary Examiner* — Ian N Moore
*Assistant Examiner* — Lakeram Jangbahadur (57) ABSTRACT

Implementations described and claimed herein provided for a system for provisioning network resources. The system includes a network provisioning abstraction layer having an application interface for receiving network provisioning requests from applications and determine provisioning instructions for fulfilling the requests. Each of the received provisioning instructions is queued in a priority queuing system according to a request priority. The provisioning instructions for the highest priority requests are removed from the front of the queue and sent to a resource interface that relays the requests to the appropriate network resources.

8 Claims, 4 Drawing Sheets

(56) References Cited

U.S. PATENT DOCUMENTS

2013/0014101 A1    1/2013   Ballani et al.

OTHER PUBLICATIONS

Written Opinion of the International Searching Authority, dated Sep. 4, 2014, Int'l Appl. No. PCT/US14/032200, Int'l Filing Date Mar. 28, 2014; 5 pgs.
Extended European Search Report, dated Jul. 26, 2016, Application No. 14775701.7, filed Mar. 28, 2014; 7 pgs.

* cited by examiner

SYSTEM AND METHOD FOR NETWORK PROVISIONING

CROSS REFERENCE TO RELATED APPLICATION

This application claims priority under 35 U.S.C. §119(e) to U.S. Provisional Patent Application No. 61/806,298, titled "SYSTEM AND METHOD FOR NETWORK PROVISIONING," filed on Mar. 28, 2013, the disclosure of which is hereby incorporated by reference.

FIELD OF THE DISCLOSURE

Aspects of the present disclosure relate to a system and process for providing an interface for provisioning voice switching elements in telecommunications networks.

BACKGROUND

To provide telecommunication services to a customer requires various telecommunication network resources to be provisioned. For example, to add telephone service to a customer, telephone numbers are assigned to the customer and network elements are configured to route calls to and from the customer, among other things. Often, the initiation of a service or some other action with a network, such as a telecommunication system, begins with a generalized information technology (IT) application that is not especially suited for or otherwise configured to provision the resources needed for whatever service or task that the application involves. Accordingly, additional devices and processes are required to provision resources in order to perform some requested service initiated at an IT application.

It is with these and other issues in mind that various aspects of the present disclosure were developed.

SUMMARY

According to one aspect, a system and method is provided for performing network provisioning using an abstraction layer. The network provisioning abstraction layer receives network provisioning requests from one or more applications. A database is queried using the information provided by each network provisioning requests to determine provisioning instructions for carrying out the request. The provisioning instructions are placed in a queue according to the priority of the network provisioning request. The highest priority provisioning instructions are de-queued and are sent to the resource interface where the instructions are relayed to the appropriate network resources for fulfilling the network provisioning request.

DETAILED DESCRIPTION

Implementations of the present disclosure involve a system and method for provisioning telecommunications network resources and services. In particular, the present disclosure provides for a network provisioning system that utilizes an abstraction layer as an interface between applications that request the use of network resources and the provisioning of the network resources to fulfill the requests. The network provisioning abstraction layer receives requests for network resources from the applications at an application interface, generates provisioning instructions, prioritizes the requests using a queuing system, and communicates the provisioning instructions to one or more network resources in order to provision the necessary resources to fulfill the requests. The queuing system includes one or more prioritized queues and a queue manager for adding and forwarding provisioning instructions from the queues. From the queue or queues, depending on the implementation, the provisioning instructions are conveyed to the network resources in a manner and format to provision the resources. In some instances, the instructions are provided to an interface that translates or otherwise generates properly formatted instructions to an associated network resource in order to provision the resource. The network abstraction layer also determines when a request involves the provisioning of multiple network resources, determines each provisioning instruction required to carry out the original request, and queues and relays all of the required provisioning instructions in the appropriate order for executing the original request while avoiding service outages.

Figure 1:
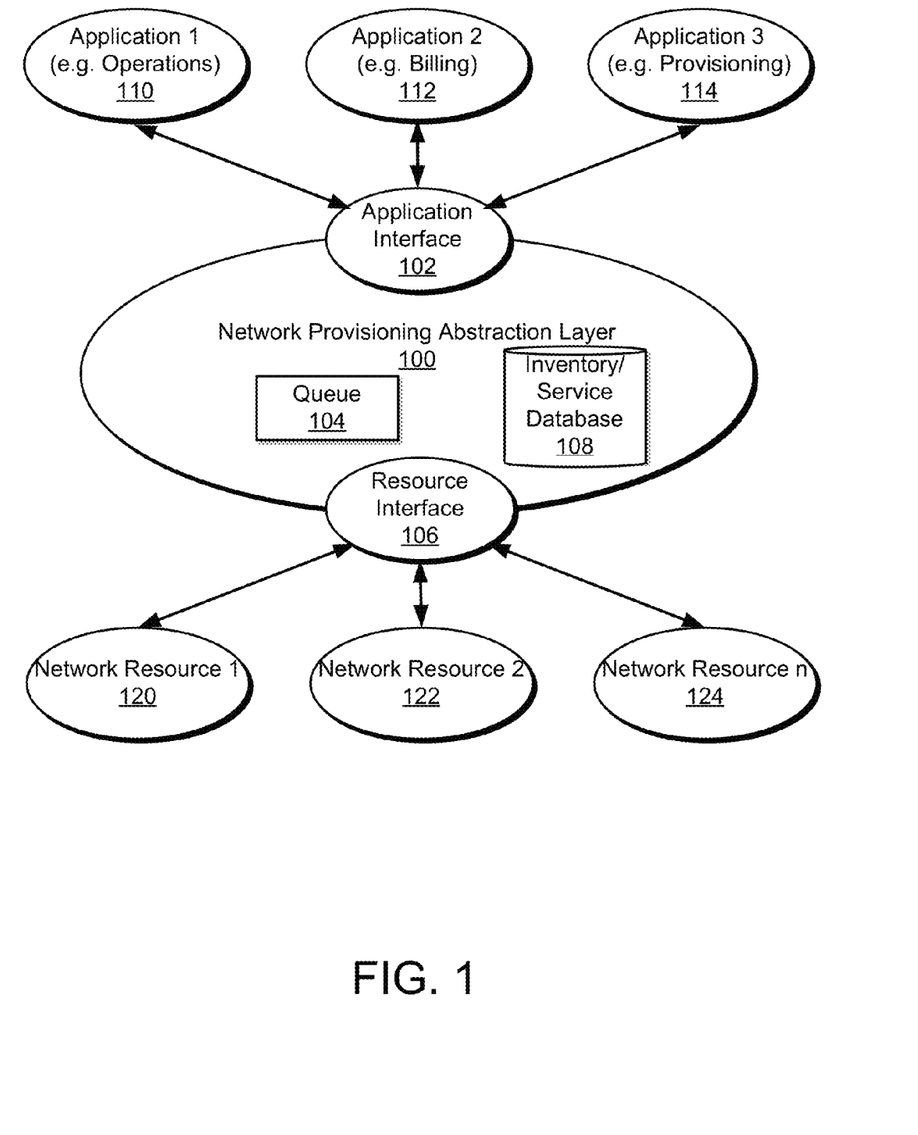
FIG. 1 depicts an example of a network provisioning abstraction layer providing an interface between IT tools and applications and network resources.

Referring to FIG. 1, an example network provisioning system is depicted. The network provisioning system includes a network provisioning abstraction layer 100 that receives network provisioning requests from applications 110-114 at an application interface 102. The network provisioning abstraction layer 100 identifies the nature of each request, including the request's priority and the provisioning instructions needed to complete the request, and places the provisioning instructions in a queue 104. The provisioning instructions are removed from the queue and are formatted and sent to a network resource 120-124 using a resource interface 106.

The applications 110-114 may include any applications involved in providing a telecommunication service, or other service, and that involve provisioning a network resource or resources. In this example, the applications 110-114 include an operations application 110, a billing application 112, and a provisioning application 114. The applications 110-114 are configured to make network provisioning requests which may, for example, include requests for the assignment of ports, creation and modification of accounts, adding or removing telephone numbers, account and service related queries, or any other type of network resource related request. Operations application 110 includes any applications used for the operation of a telecommunications network. For example, operations applications 110 are involved with maintaining and monitoring the operation of a telecommunication network and adding and removing users and features from the network. Billing applications 112 are applications configured for accounting for customer services, generating invoices, tracking payments, and the like. Provisioning applications 114 are applications adapted to identify and provision services according to customer criteria. It should be understood that the illustrated applications are used for example purposes and other applications, either generic or specific to the telecommunications field, may also be used. In one example discussed herein to illustrate features of the provided system, the provisioning application 114 relates to a least cost routing system that provisions routes and rates for the routes of a telecommunication system.

Each application 110-114 may utilize a different method of communication and format the communication in various ways. Communication examples include an application programming interface (API), a command line interface (CLI), extensible markup language (XML), and common object request broker architecture (CORBA). These example communications formats are used for illustrative purposes and it should be understood that other types of communication methods and/or formatting may be used.

The application interface 102 may include specialized adapters configured to communicate with the applications 110-114. For example, in the case of applications that include an application programming interface (API) for communicating with the application, the corresponding adapter is configured to receive requests and return statuses according to the application's API.

The network resources 120-124 include any network resources, including telecommunication resources such as real-time growth switching platforms and soft switching platforms. In one example, a network resource 120 includes Collab mixing elements, a network resource 122 includes time-division multiplexing (TDM) voice switching elements, and a network resource 124 includes Voice over Internet Protocol (VoIP) switching elements. The network resources 120-124 may also include a switching platform that includes resources such as networking trunks, switching equipment, tables for allocating direct inward dial (DID) numbers, as well as any other tools or systems for allocating telecommunications components and infrastructure. In order to perform certain functions, one or more network resources 120-124 are typically provisioned in order to fulfill a request.

The resource interface 106 is configured for communications between the network provisioning abstraction layer 100 and the network resources 120-124. Similar to the applications 110-114, the network resources 120-124 may each be configured to communicate using different communications formats. For example, the network resource 120 may communicate using plain text sent using a command line interface, the network resource 122 may communicate using a resource specific API, and the network resource 124 may communicate using a COBRA interface.

In one example, each application 110-114 operates on a computing device such as a personal computer, smartphone, tablet, or other device that communicates to the network provisioning abstraction layer 100 using a network such as a local area network (LAN), the Internet, or any other network or combination thereof. The network provision abstraction layer may operate on a server or other computing device that is able to communicate with the network resources 120-124, by a network or other form of communication.

Figure 2:
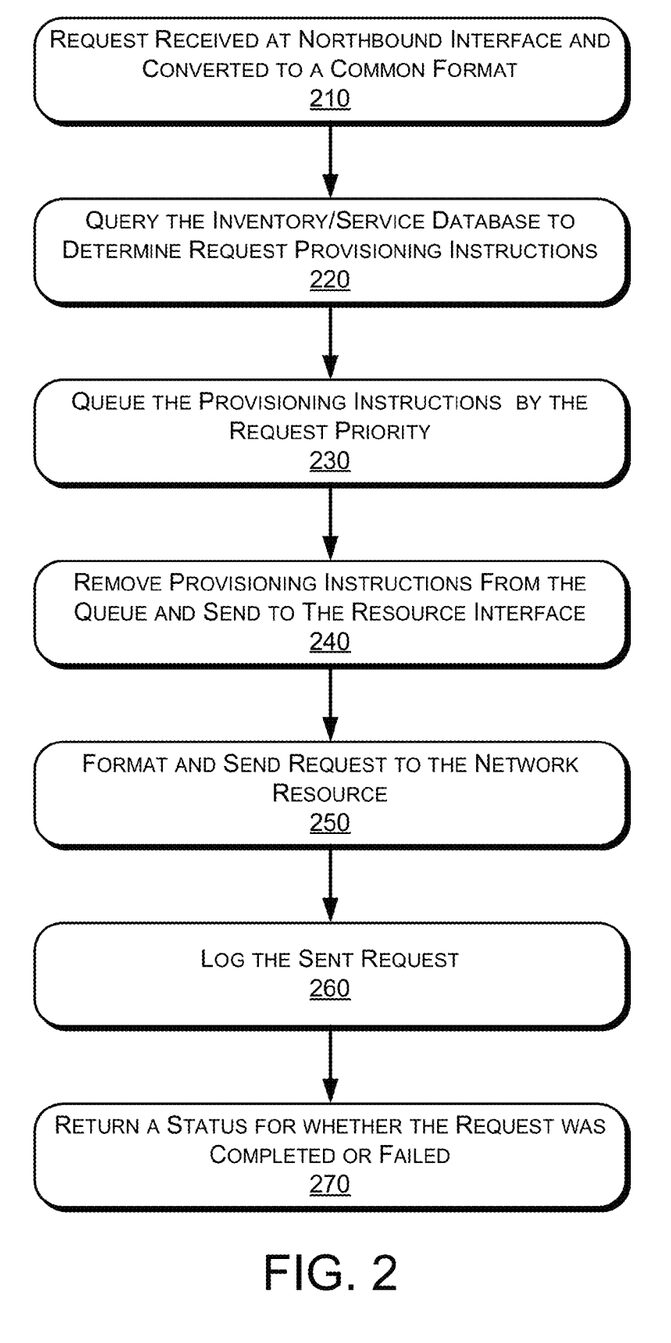
FIG. 2 depicts a method network provisioning using an abstraction layer

Referring to FIG. 2, an example method of network provisioning utilizing the system shown in FIG. 1 or FIG. 3 (discussed below) is depicted. In this example, the applications 110-114 are each configured to send network provisioning requests for carrying out a telecommunications operation to the network provisioning abstraction layer 100.

During operation, the applications 110-114 make requests for a network resource to accomplish some task as specified by the application, which may be managed by a user through a graphical user interface or otherwise. For example, the least cost routing provisioning application 114 may need to provision 10 DID telephone numbers. The least cost routing provisioning application 114 therefore sends a request for 10 DIDs to the network provisioning abstraction layer 100 using the communications method of the least cost routing provisioning application 114. For example, the least cost routing provisioning application 114 may communicate the request in a text format using a command line interface (CLI). The request may include an application ID, customer ID, request type, a number of DIDs requested, request priority, and location. In this case, the request could be "3, 1000, DID, 10, 3, 111 W. Elm St, Topeka, Kans., USA."

The network provisioning abstraction layer 100 receives the requests for network resources from the least cost routing application 114 at the application interface 102 (operation 210). The application interface 102 includes an adapter suited to accommodate communications from the least cost routing application 114. In one example, the application interface 102 is configured to receive the text from the CLI interface and is configured to parse the text and place it in a common format that is useable by the network provisioning abstraction layer 100. For example, the common format may include a data structure or object with the fields required for looking up the provisioning instructions for provisioning the appropriate network resources to fulfill the request.

In one example, the network provisioning abstraction layer 100 and the applications 110-114 operate in a publish/subscribe configuration. Anytime a new request is made by an application 110-114, the application 110-114 notifies the network provisioning abstraction layer 100 of the new request. The network provisioning abstraction layer 100 then queries the application 110-114 to download the request. The publish/subscribe model allows for the network provisioning abstraction layer 100 to control when requests are received, and to assist in throttling and prioritizing requests, among other functions.

The network provisioning abstraction layer 100 may also authenticate any application or application user 110-114 making a network provisioning requests before processing the requests. For example, an application user may be required to authenticate with the user's login credentials by using a username and password. In the case of an automated provisioning application, the application may login by providing the network provisioning abstraction layer 100 with an access token or use an alternative authentication method. The provisioning abstraction layer 100 may also include multiple authorization levels limiting the types of requests each user can make. For example, the least cost routing application 114 may be authorized to make requests for new services, such as the example request for 10 new DIDs. Conversely, the least cost routing application 114 may not be permitted to add and delete system administrators.

Each time the network provisioning abstraction layer 100 receives a request, the request, the commonized format of the request, or some other data based on the request, is used to query an inventory/service database 108 to obtain the appropriate provisioning instructions for carrying out the request (operation 220). The request is also validated to ensure the request included all of the information required to obtain the provisioning instructions for carrying out the request. For example, each type of request may include required fields for searching the database 108 for the provisioning instructions, which may involve provisioning multiple network resources and an order to such provisioning. The network provisioning abstraction layer 100 compares the type of request being made to what is needed for determining the provisioning instructions using the database 108. If a required element of data is not present, the network provisioning abstraction layer 100 rejects the request and sends a status indicating the rejection back to the requesting application 110-114 including the reason for the rejection. As is discussed herein, the request is also associated with a priority based on the type of the request being made or the application 110-114 making the request.

The provisioning instructions for the request may also include instructions for provisioning additional resources that are needed for provisioning the requested network service. For example, in order to provide a customer with 10 DIDs, bandwidth through one or more telecommunications trunks needs to be allocated, as well as bandwidth and access through switching resources such as through one or more media gateways and/or session border controllers. In this example, the provisioning instructions provided by the inventory/service database 108 include instructions for allocating the 10 DIDs, instructions for allocating any necessary trunks, and instructions for allocating any necessary switching resources.

In some examples, the network provisioning abstraction layer 100 is configured to automatically reject any invalid network provisioning requests. For example, if the network provisioning request is for an impossible task, such as a service that is not offered, the application interface 102 rejects the request. In another example, the application interface 102 may reject a request if the request includes a transaction rate that exceeds a published transaction rate. In these cases, even though the request exceeds a published transaction rate, the request may be queued indefinitely to be processed at a later time, for example, when the transaction rate drops.

Once the provisioning instructions have been determined, the provisioning instructions are added to the priority queue 104 according to the request's priority (operation 230). In the example DID request, the least cost routing application 114 indicated that the request had a priority level of three which may correspond to a level priority less than a priority of one or two. The provisioning instructions are therefore added to the priority queue 104 according to the provided priority level. The queue or queues may be managed in various ways. In one specific example, discussed relative to FIG. 3, a plurality of queues is provided, each with a different priority level. The queue or queues may be implemented as buffers FIFO buffers or other memory structures.

Concurrent with the addition of provisioning instructions to the priority queue 104, provisioning instructions are released from the priority queue 104 for execution (operation 240). Once released from the queue 104, the network provisioning abstraction layer 100 sends the provisioning instructions to the resource interface 106. As discussed herein, the network resources 120-124 also send and receive communications using their own communications formats. The resource interface 106 is configured to use the provisioning instructions to send the appropriate provisioning instructions to each network resource 120-124 required for performing the network provisioning request in parallel or in a required order. The resource interface 106 is also configured to format the request to a network resource's communications format if necessary. The provisioning instructions are formatted and sent to the appropriate network resource (operation 250).

The provisioning instructions for allocating the DIDs would therefore be sent to the network resource for allocating DIDs (e.g., network resource 120), the instructions for allocating the appropriate network trunk(s) would be sent to the network resource or resources capable of allocating the trunks (e.g., network resource 122), and the instructions for allocating switching resources would be sent to the network resource for allocating the switching resources (e.g., network resource 124).

In one example, the resource interface 106 includes a throttling mechanism configured to ensure that tasks are not sent in a way that affects call processing features or elements, for example. Additionally, certain requests need to be completed before a following request can be made. The throttling mechanism may be set to different rates, which may depend on the type of resource being provisioned. The resource interface 106 may also receive any acknowledgements from the network resource being provisioned. For example, the network resource may indicate when a provisioning operation has been completed, and the resource interface may manage subsequent requests based on the completion of the preceding task (if necessary). For example, the throttling mechanism may cause the system to wait until a status for a previous request has been returned. Thus, if the DIDs must be allocated before the trunks and switching are allocated, the throttling mechanism holds the instructions for the trunks and switching until the request for the DIDs has been completed.

The network provisioning abstraction layer 100 also logs each network provisioning request that is received and the instructions sent to each network resource in a request log (operation 260). The request log may include the network provisioning request, a timestamp of when the request was received, the application that sent the request, the instructions for executing the request, and any other relevant information. The request log may operate as a database, list, or other data structure. The request log may also be used by the network provisioning abstraction layer 100 to undo one or more transactions. For example, the network provisioning abstraction layer 100 may be configured with "back out" capabilities for when a single transaction triggered by an instruction, out of multiple transactions required by a request fails because when a single transaction of a request fails, the entire request has failed. The network provisioning abstraction layer 100 may then roll-back any completed transactions by issuing new instructions that nullify the previously completed instructions. The end result of the roll-back is that the network resources 120-124 behave as if the original network provisioning request was never made.

Once a network provisioning instruction has been executed and is either completed or has failed, the network resource 120-124 communicates the status of the instruction back to the resource interface 106. The resource interface 106 may determine if the provisioning request has succeeded or failed and sends the status to the application interface 102 for reporting back to the requesting application. The application interface 102 formats the status at the appropriate adapter to the communications format of the requesting application 110-114 and returns the status to the requesting application (operation 270).

Figure 3:
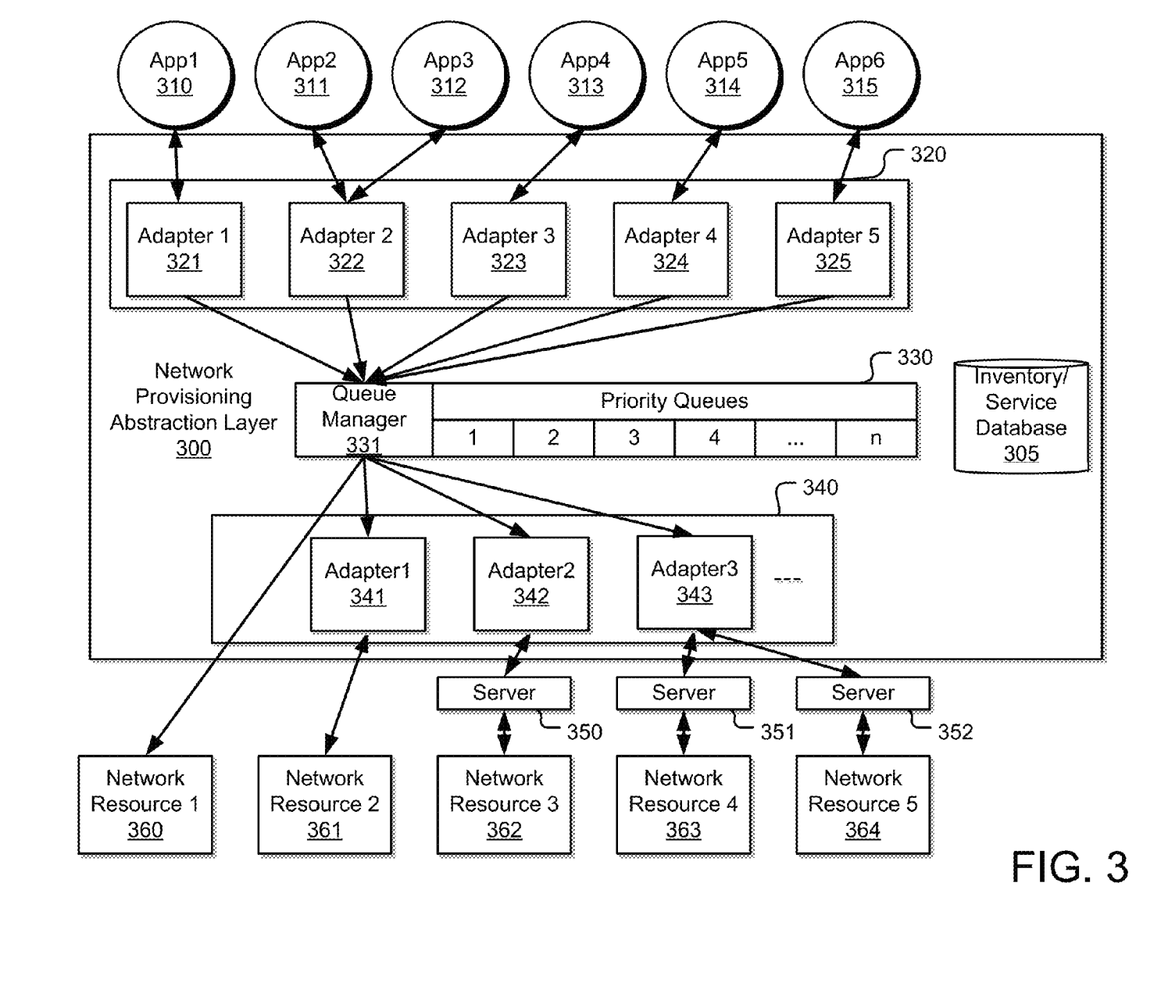
FIG. 3 depicts an example of a network provisioning abstraction layer with priority queues for both providing an interface between IT tools and applications and network resources as well as prioritizing requests made by the IT tools and applications.

Referring to FIG. 3, a second embodiment of a network provisioning system using a network provisioning abstraction layer 300 is depicted. In this embodiment, the network provisioning abstraction layer 300 includes an inventory and service database 305, an application interface 320, a priority queue 330, and a resource interface 340. The application interface 320 includes adapters 321-325 for communicating with one or more applications 310-315.

In many instances, the network provisioning abstraction layer 300 receives multiple requests at relatively the same time from a plurality of applications 310-315. For a variety of reasons, the influx of requests cannot be immediately processed and sent to the network resources 360-364. Thus, the network provisioning abstraction layer 300 receives network provisioning requests, determines the provisioning instructions for carrying out the request, and places the provisioning instructions in one or more priority queues 330. For example, the provisioning abstraction layer 300 may be configured to add the provisioning instructions to the priority queue based on the original request's priority.

In this example, the network provisioning abstraction layer 300 includes a priority queuing system 330 with a queue manager 331 and a plurality of queues, each with a designated priority. In one example, queue 1 is used for priority level 1 requests, queue 2 is used for priority level 2 requests, queue 3 is used for priority level 3 requests, and so on. Provisioning instructions for carrying are queued (as discussed above relative to FIGS. 1 and 2) by the queue manager 331 according to the requests priority. For example, the above DID request had a priority of 3 and the corresponding provisioning instructions would therefore be placed with queue 3. A second network provisioning request for opening a new account may have a priority of 1, resulting in the corresponding provisioning instructions being queued in queue 1.

In one example, specific high-priority queues may be mapped to specific applications or adapters and lower priority queues may be mapped to other applications/adapters. For example, a billing application, such as the billing application 112, may perform network provisioning requests that return the status of a customer account for billing purposes. Billing requests may have a relatively low priority and may therefore be directed to a lower priority queue, such as queue 4. Conversely, the provisioning application 114 discussed above, may be providing customers with real-time provisioning of network resources and is therefore mapped to a high priority queue, such as queue 1. In another example, certain types of requests may automatically be assigned a priority. For example, every new account request may be assigned a high priority, while every rerouting request may all be assigned a relatively lower priority.

The queuing manager 331 is configured to de-queue provisioning instructions from high-priority queues before de-queuing provisioning instructions from lower priority queues. For example, if queue 1 is a higher priority queue and queue 2 is a lower priority queue, the queue manager 331 is configured to de-queue all instructions from queue 1 before de-queuing any instructions queued in queue 2. The queue manager 331 may continuously check higher priority queues before de-queuing any instructions from lower priority queues, returning from de-queuing the lower priority queues whenever a new, higher priority request is received. In another example, the queue manager 331 may also be configured to spend relatively longer de-queuing high priority queues relative to low priority queues. Alternatively, the queue manager may have a de-queuing cycle where relatively more time is spent de-queuing from relatively higher priority queues relative to low priority queues.

De-queued instructions are sent to the resource interface 340 for transmission to the various network resources 360. In some cases, a network resource 360 may receive instructions in the same format utilized by the network provisioning abstraction layer 300. In these cases, the provisioning instructions may be sent directly from the resource interface 340 to the network resource 360 without processing by an adapter 341-343. In other examples, the adapters 341-343 format each provisioning instruction to a format utilized by the network resource 361-364 that the instructions are being sent to. In some cases, the resource interface 340 is not directly connected to each network resource 362-364, but instead sends the provisioning instructions to a server 350-352 configured to manage each network resource 362-364. In one example, the servers 350-352 may include element management servers (EMS) that are each specifically configured to manage requests for specific network resources. The EMSs may include their own first-in-first-out (FIFO) queues for delivering provisioning instructions to the network resources 362-364. Provisioning instructions are therefore formatted for communications with the EMSs 350-352 and provided in an appropriate order for execution of provisioning.

Figure 4:
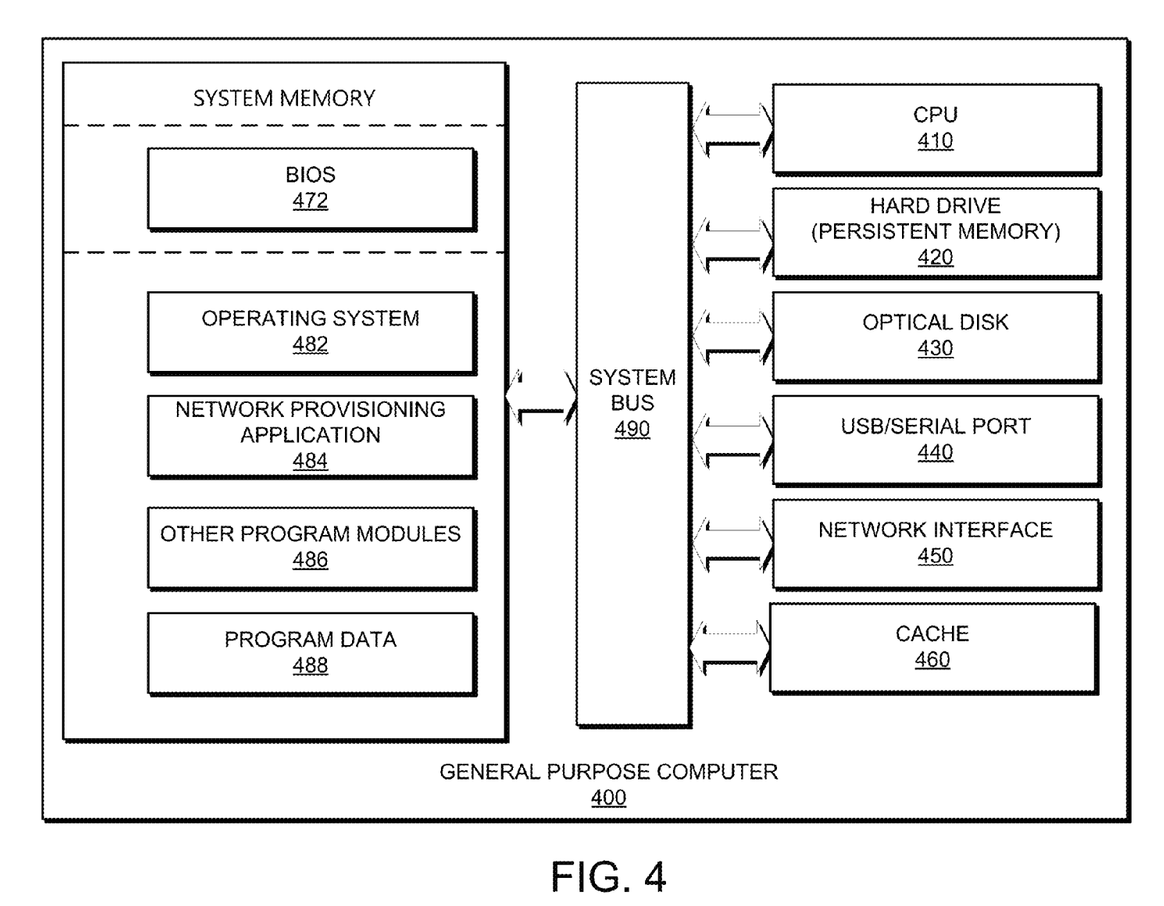
FIG. 4 is a block diagram illustrating an example of a general purpose computing system that may be used in the application of the present disclosure.

FIG. 4 illustrates an example general purpose computer 400 that may be useful in implementing the described technology. The example hardware and operating environment of FIG. 4 for implementing the described technology includes a computing device, such as general purpose computing device in the form of a personal computer, server, or other type of computing device. In the implementation of FIG. 4, for example, the general purpose computer 400 includes a processor 410, a cache 460, a system memory 470, 480, and a system bus 490 that operatively couples various system components including the cache 460 and the system memory 470, 480 to the processor 410. There may be only one or there may be more than one processor 410, such that the processor of general purpose computer 400 comprises a single central processing unit (CPU), or a plurality of processing units, commonly referred to as a parallel processing environment. The general purpose computer 400 may be a conventional computer, a distributed computer, or any other type of computer; this disclosure is not so limited.

The system bus 490 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 470 and random access memory (RAM) 480. A basic input/output system (BIOS) 472, containing the basic routines that help to transfer information between elements within the general purpose computer 400 such as during start-up, is stored in ROM 470. The general purpose computer 400 further includes a hard disk drive 420 for reading from and writing to a persistent memory such as a hard disk, not shown and an optical disk drive 430 for reading from or writing to a removable optical disk such as a CD ROM, DVD, or other optical media.

The hard disk drive 420 and optical disk drive 430 are connected to the system bus 490. The drives and their associated computer-readable media provide nonvolatile storage of computer-readable instructions, data structures, program engines and other data for the general purpose computer 400. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, ROM 470, or RAM 480, including an operating system 482, a network provisioning application 484, and one or more application programs 486. A user may enter commands and information into the general purpose computer 400 through input devices such as a keyboard and pointing device connected to the USB or Serial Port 440. These and other input devices are often connected to the processor 410 through the USB or serial port interface 440 that is coupled to the system bus 490, but may be connected by other interfaces, such as a parallel port. A monitor or other type of display device may also be connected to the system bus 490 via an interface, such as a video adapter 460. In addition to the monitor, computers typically include other peripheral output devices (not shown), such as speakers and printers.

The general purpose computer 400 may operate in a networked environment using logical connections to one or more remote computers. These logical connections are achieved by a network interface 450 coupled to or a part of the general purpose computer 400; this disclosure is not limited to a particular type of communications device. The remote computer may be another computer, a server, a router, a network PC, a client, a peer device, or other common network node, and typically includes many or all of the elements described above relative to the general purpose computer 400. The logical connections include a local-area network (LAN) a wide-area network (WAN), or any other network. Such networking environments are commonplace in office networks, enterprise-wide computer networks, intranets and the Internet, which are all types of networks.

The network adapter 450, which may be internal or external, is connected to the system bus 450. In a networked environment, programs depicted relative to the general purpose computer 400, or portions thereof, may be stored in the remote memory storage device. It is appreciated that the network connections shown are example and other means of and communications devices for establishing a communications link between the computers may be used.

Some embodiments of the network provisioning system described herein are implemented as logical steps in one or more computer systems. The logical operations of the present system are implemented (1) as a sequence of processor-implemented steps executing in one or more computer systems and (2) as interconnected machine or circuit engines within one or more computer systems. The implementation is a matter of choice, dependent on the performance requirements of the computer system implementing the network provisioning system. Accordingly, the logical operations making up the embodiments of the system described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the network provisioning system. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the network provisioning system and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A system for network provisioning comprising:
   a computing device including a processor coupled to a memory, the memory storing instructions for execution on the processor, the instructions configured to cause the processor to:
      receive a first network provisioning request for provisioning a first network resource, the first network provisioning request having a first priority level and being received from a first application;
      query a database based on the first network provisioning request and retrieve at least one provisioning instruction for fulfilling the first network provisioning request;
      add the at least one provisioning instruction to a priority queue according to the first priority level;
      send the at least one provisioning instruction to a first network resource; and
   an application interface comprising:
      a first application adapter configured to receive the first network provisioning request in a first format and convert the first network provisioning request to a common format for use with querying the database, wherein the common format is different than the first format, and
      a second application adapter configured to receive a second network provisioning request for provisioning a second network resource in a second format different than the first format and the common format, the second application adapter configured to convert the second network provisioning request from the second format to the common format for use with querying the database.

2. The system of claim 1, wherein the at least one provisioning instruction comprises:
   a first instruction for provisioning the first network resource in order to fulfill the first network provisioning request; and
   a second instruction for provisioning a second network resource in order to fulfill the first network provisioning request.

3. The system of claim 2, further comprising a resource interface that comprises a first resource adapter configured to format the first instruction to a first network resource format and send the first instruction in the first network resource format to the first network resource to provision the first network provisioning request.

4. The system of claim 3, wherein the resource interface further comprises a second resource adapter configured to format the second instruction to a second network resource format and send the second instruction in the second network resource format to the second network resource to provision the second network resource.

5. The system of claim 1, wherein the first priority level corresponds to a priority level assigned to each request made by the first application.

6. The system of claim 1, wherein the priority queue comprises a plurality of queues, each queue associated with a different priority level, including at least a high priority queue for a high priority network provisioning request and a low priority queue for a low priority network provisioning request.

7. The system of claim 6, wherein the high priority queue is empty before the low priority queue is de-queued.

8. The system of claim 1, wherein the instructions are further configured to cause the processor to:
  receive a status from the first network resource after an execution of at least one provisioning instruction by the first network resource; and
  report the status to the first application.

* * * * *